(12) United States Patent
Morita

(10) Patent No.: US 7,123,886 B2
(45) Date of Patent: Oct. 17, 2006

(54) HANDHELD MOBILE PHONE WITH A DETACHABLE BATTERY PACK

(75) Inventor: Yuichi Morita, Tokyo (JP)

(73) Assignee: NEC Corporation, Tokyo (JP)

( * ) Notice: Subject to any disclaimer, the term of this patent is extended or adjusted under 35 U.S.C. 154(b) by 346 days.

(21) Appl. No.: 10/132,272

(22) Filed: Apr. 26, 2002

(65) Prior Publication Data
US 2002/0160728 A1 Oct. 31, 2002

(30) Foreign Application Priority Data
Apr. 27, 2001 (JP) ............................. 2001-130681

(51) Int. Cl.
H04B 1/38 (2006.01)
(52) U.S. Cl. .................. 455/90.3; 455/575.1; 455/558; 455/550.1; 455/557; 455/556.1; 379/114.15; 379/201.03; 379/211.01; 379/211.05
(58) Field of Classification Search .............. 455/90.1, 455/550.1, 558, 575.1, 90.3, 557, 556.1, 455/556.2, 57.1; 379/201.01, 211.01, 114.19, 379/357.01
See application file for complete search history.

(56) References Cited

U.S. PATENT DOCUMENTS

| | | | | |
|---|---|---|---|---|
| 5,768,370 A | * | 6/1998 | Maatta et al. .......... | 379/433.01 |
| 5,797,089 A | * | 8/1998 | Nguyen ....................... | 455/403 |
| 5,896,574 A | * | 4/1999 | Bass, Sr. .................... | 455/557 |
| 5,918,189 A | * | 6/1999 | Kivela ...................... | 455/575.1 |
| 6,244,894 B1 | | 6/2001 | Miyashita | |
| 6,400,965 B1 | * | 6/2002 | Phillips et al. .............. | 455/558 |
| 6,427,078 B1 | * | 7/2002 | Wilska et al. ............ | 455/550.1 |
| 6,461,193 B1 | * | 10/2002 | Matthies .................... | 439/509 |
| 6,490,436 B1 | * | 12/2002 | Kaiwa et al. .............. | 455/90.1 |
| 6,526,287 B1 | * | 2/2003 | Lee .......................... | 455/556.1 |
| 6,731,952 B1 | * | 5/2004 | Schaeffer et al. ........... | 455/557 |
| 2002/0037748 A1 | * | 3/2002 | Matsumoto ................. | 455/558 |

FOREIGN PATENT DOCUMENTS

| | | |
|---|---|---|
| AU | 200013602 B3 | 1/2000 |
| CN | 1265548 A | 3/2000 |
| EP | 0 505 931 A2 | 3/1993 |
| EP | 0 635 963 A2 | 1/1995 |
| EP | 0 967 771 A2 | 12/1999 |
| EP | 1 193 889 A2 | 4/2002 |
| GB | 2 347 568 A | 9/2000 |
| GB | 2 356 275 A | 5/2001 |
| GB | 2 363 882 A2 | 1/2002 |
| JP | 2001 111664 A | 1/2002 |

* cited by examiner

Primary Examiner—Marceau Milord
(74) Attorney, Agent, or Firm—Whitham, Curtis, Christofferson & Cook, PC

(57) ABSTRACT

In a handheld mobile phone (10) having a detachable battery pack (20) which can be removably mounted to a body (11) of the handheld mobile phone, the detachable battery pack has a memory card receiving recess (22) for removably receiving a body of a memory card (30), and the body of the handheld mobile phone has a plurality of contacts (15) which are brought into electrical contact with contact terminals (31) of the memory card mounted to the detachable battery pack when the detachable battery pack is mounted to the body of the handheld mobile phone.

8 Claims, 2 Drawing Sheets

HANDHELD MOBILE PHONE WITH A DETACHABLE BATTERY PACK

BACKGROUND OF THE INVENTION

The present invention relates to a handheld mobile phone capable of utilizing an exchangeable memory card, and more specifically to a handheld mobile phone capable of utilizing an exchangeable memory card, which can be mounted on a detachable battery pack.

Some of prior art handheld mobile phones have a memory card detachable to a body of the handheld mobile phone and the function of recording a conversation in the memory card and reproducing the conversation recorded in the memory card, so that it is possible to save a dilatory handwork for memorizing the summary of the conversation or for pressing a key pad for calling (For example, JP-A-2000-032169).

However, in order to use the memory card, it is necessary to provide a connector having a guide for fitting the memory card within a body of the handheld mobile phone, on a printed circuit board mounted within the body of the handheld mobile phone. As a result, a substantial area is consumed on the printed circuit board, and a dead space occurs.

In addition, the connector is required to have a housing for pushing terminals of the memory card to the connector, with the result that it is difficult to thin the body of the handheld mobile phone.

BRIEF SUMMARY OF THE INVENTION

Accordingly, it is an object of the present invention to provide a handheld mobile phone having a memory card, which has overcome the above mentioned problems of the prior art.

Another object of the present invention is to provide a handheld mobile phone having a memory card, capable of efficiently utilizing the space on the printed circuit board.

Still another object of the present invention is to provide a handheld mobile phone having a memory card, capable of efficiently thinning the body of the handheld mobile phone.

The above and other objects of the present invention are achieved in accordance with the present invention by a handheld mobile phone having a detachable battery pack which can be removably mounted to a body of the handheld mobile phone, wherein the detachable battery pack has a memory card receiving part for removably receiving a body of a memory card, and the body of the handheld mobile phone has a plurality of external contacts which are brought into electrical contact with contact terminals of the memory card mounted to the detachable battery pack when the detachable battery pack is mounted to the body of the handheld mobile phone.

Preferably, the memory card receiving part of the detachable battery pack is so configured to receive the memory card in such a condition that the contact terminals of the memory card are exposed to the body of the handheld mobile phone, and the plurality of external contacts provided in the body of the handheld mobile phone are formed of a plurality of springy contacts which are brought into resilient contact with the contact terminals of the memory card mounted to the detachable battery pack when the detachable battery pack is mounted to the body of the handheld mobile phone.

Specifically, the detachable battery pack includes a receiving port through which the memory card is inserted from an external, a guide means for guiding the memory card from the receiving port to the memory card receiving part, and a retaining means for detachably latching the memory card accommodated in the memory card receiving part.

In addition, the receiving port is exposed when the detachable battery pack is mounted to the body of the handheld mobile phone.

Furthermore, the detachable battery pack includes a spring provided at a deep end of the memory card receiving part, for exerting on the memory card a biasing force pushing the memory card toward the receiving port In addition, the memory card receiving part has a stopper for preventing the memory card from being inserted to the memory card receiving part when the memory card is improperly inserted from the receiving port, and the memory card has a cut which is never contacted with the stopper when the memory card is properly inserted from the receiving port to the memory card receiving part.

In the above mentioned handheld mobile phone with the detachable battery pack, the detachable battery pack has the memory card receiving part removably receiving the body of the memory card, and on the other hand, the body of the handheld mobile phone has the external contacts which are brought into contact with the contact terminals of the memory card mounted to the battery pack when the battery pack is fitted into the body of the handheld mobile phone. Here, the external contacts are connected to an electronic circuit internally provided within the body of the handheld mobile phone. Thus, since the contact terminals of the memory card are forcibly and stably brought into electrical contact with the external contacts of the body of the handheld mobile phone by action of the battery pack which is mounted to the body of the handheld mobile phone. On the other hand, since it is no longer necessary to provide a connector having a guide for fitting the memory card within the body of the handheld mobile phone, on a printed circuit board mounted within the body of the handheld mobile phone, the body of the handheld mobile phone can be effectively thinned and a space on the printed circuit board can be efficiently utilized.

The above and other objects, features and advantages of the present invention will be apparent from the following description of preferred embodiments of the invention with reference to the accompanying drawings.

DETAILED DESCRIPTION OF THE INVENTION

Figure 1:
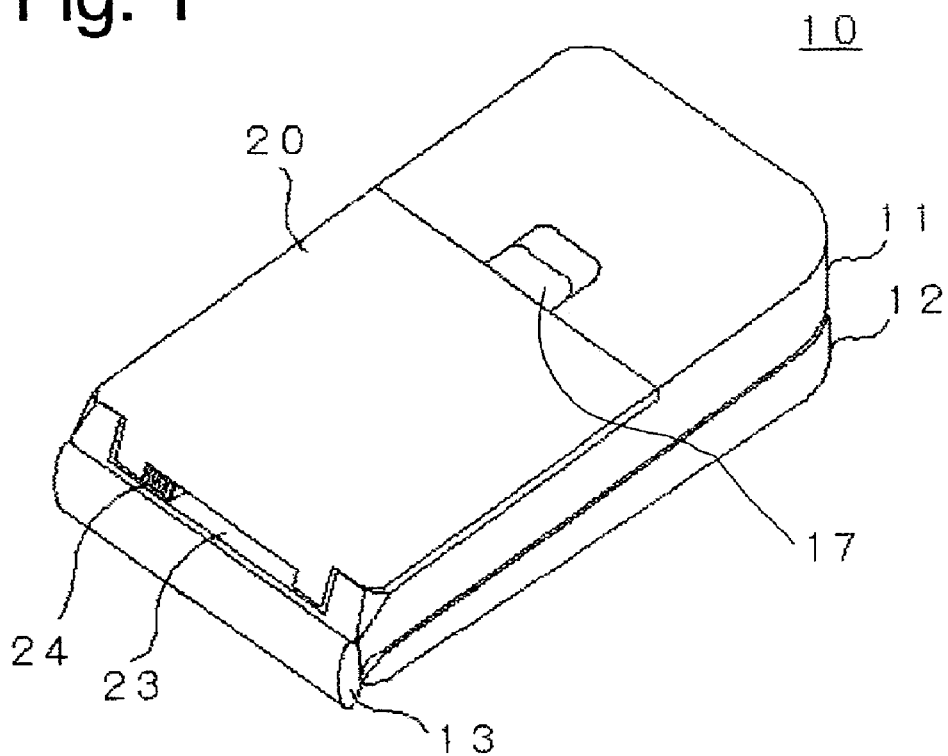
FIG. 1 is a diagrammatic perspective view of an embodiment of the handheld mobile phone in accordance with the present invention in a condition that a battery pack is fitted into the body of a foldable handheld mobile phone in a folded condition.
Figure 2:
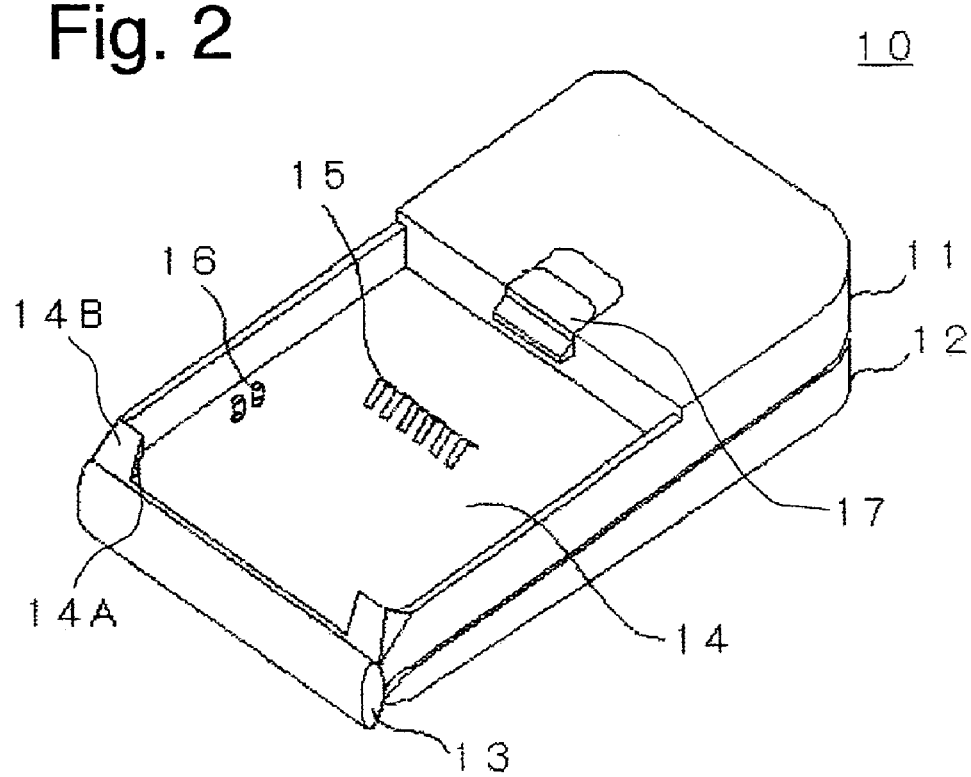
FIG. 2 is a diagrammatic perspective view of the handheld mobile phone shown in FIG. 1 in a condition that the battery pack was removed from the body of the foldable handheld mobile phone in the folded condition.

Referring to FIGS. 1 and 2, the shown embodiment of the handheld mobile phone in accordance with the present invention is a foldable handheld mobile phone (two-part folding mobile phone) 10, which is shown in a folded condition in FIGS. 1 and 2. FIG. 1 in a condition that a battery pack is fitted into the body of a foldable handheld mobile phone in folded condition, and FIG. 2 shows a condition that the battery pack was removed from the body of the foldable handheld mobile phone in the folded condition.

The shown foldable handheld mobile phone 10 comprises an operating part housing 11 and a display part housing 12 which are rotatably or swingably coupled together by means of a hinge mechanism 13. As well known to persons skilled in the art, the operating part housing 11 includes a key pad (not shown) and a microphone (not shown) on an inner and front face (not shown) thereof, and the display part housing 12 includes an ear speaker (not shown) and a display (not shown) on an inner and front face (not shown) thereof.

As shown in FIG. 2, an outer and rear face of the operating part housing 11 has a battery pack receiving recess 14 extending from a central portion to a side adjacent to the hinge mechanism 13 and having a wide cut 14A formed in a recess wall 14B adjacent to the hinge mechanism 13 so that a battery pack 20 is detachably fitted into the receiving recess 14 in such a manner that a base end of the battery pack 20 is exposed at the wide cut 14A. Furthermore, a spring-biased latch 17 is provided at the central portion side of the battery pack receiving recess 14 to latch the battery pack 20 detachably fitted into the receiving recess 14, for holding the battery pack 20 in an unremovable condition.

Figure 4:
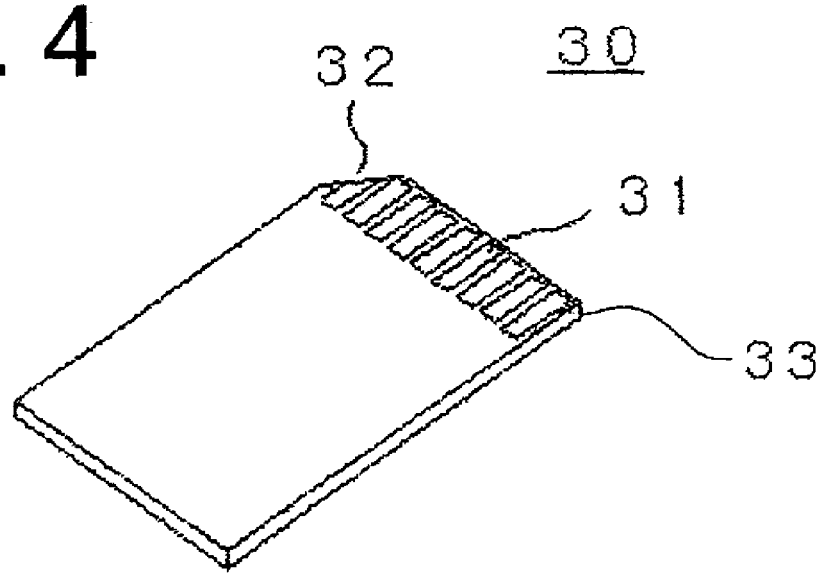
FIG. 4 is a diagrammatic perspective view of the memory card, which can be fitted into the battery pack shown in FIG. 3.

On a bottom surface of the battery pack receiving recess 14, which constitutes a portion of the outer and rear face of the operating part housing 11, an array of external springy contacts 15 are formed and projected to electrically and resiliently contact with contact terminals 31 of a memory card 30 shown in FIG. 4. Of course, the array of external springy contacts 15 are electrically connected to an internal electronic circuit (not shown) provided within the body of the mobile phone 10. Furthermore, power terminals 16 are provided on the bottom surface of the battery pack receiving recess 14 to contact with power supplying terminals 21 of the battery pack 20 so as to receive an electric power from the battery pack 20 when the battery pack 20 is fitted into the battery pack receiving recess 14 of the operating part housing 11. Of course, the power terminals 16 are electrically connected to power supply terminals of the internal electronic circuit (not shown) provided within the body of the mobile phone 10.

Figure 3:
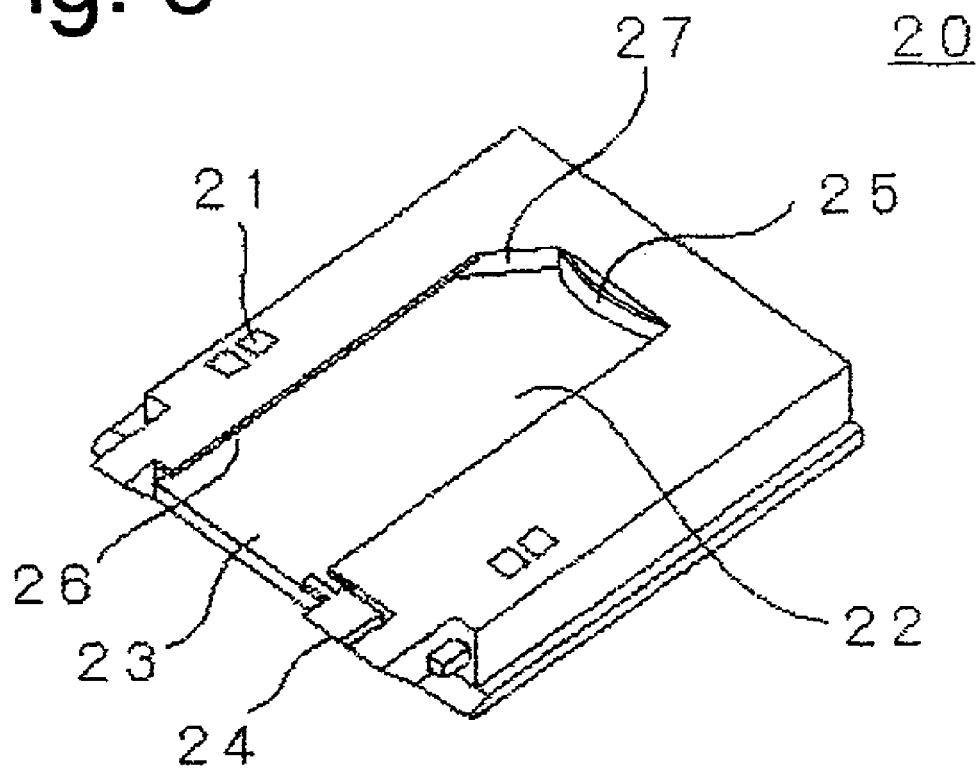
FIG. 3 is a diagrammatic perspective view of the battery pack which was detached from the body of the foldable handheld mobile phone shown in FIG. 1 and from which the memory card was removed.

Referring to FIGS. 1 and 3, the battery pack 20 includes therein a secondary cell or cells (not shown) in a casing, which includes a pair of contact terminals 21 provided on a mounting surface thereof to be brought into contact with the power terminals 16 of the operating part housing 11 when the battery pack 20 is fitted into the battery pack receiving recess 14 of the operating part housing 11. Further, the mounting surface of the casing of the battery pack 20 includes a memory card receiving recess 22 to slidably receive the memory card 30 from a receiving port 23 portioned at a side of the wide cut 14A formed in the recess wall 14B of the operating part housing 11 in the condition that the battery pack 20 is fitted into the battery pack receiving recess 14 of the operating part housing 11.

The battery pack 20 also includes a pair of guiding grooves 26 formed at opposite sides of the memory card receiving recess 22, so that the memory card 30 can be slidingly guided in the pair of guiding grooves 26 when the memory card 30 is inserted into or ejected from the memory card receiving recess 22. The battery pack 20 further includes a spring 25 provided at a deepest end of the memory card receiving recess 22 opposite to the receiving port 23, for exerting a springy biasing force on the memory card 30 in a direction ejecting the memory card 30 toward the receiving port 23 when the memory card 30 is completely inserted in the memory card receiving recess 22. The battery pack 20 includes an inclined stopper surface 27 formed on one corner of the deepest end of the memory card receiving recess 22 so that when the memory card 30 having an cut 32 formed at one corner of a tip end side thereof is properly inserted into the memory card receiving recess 22 along the pair of guiding grooves 26, the cut corner 32 of the memory card 30 is faced to the inclined stopper surface 27 with no contact with the inclined stopper surface 27, and therefore, the memory card 30 can be inserted in the deepest position contacting and pushing the spring 25, and on the other hand, when the memory card 30 is improperly inserted into the memory card receiving recess 22, a non-cut corner 33 of the tip end side of the memory card 30 is abutted against the inclined stopper surface 27 with the result that the memory card 30 cannot be inserted until the deepest position.

In addition, a memory card retaining slider 24 is provided to be slidable along the mouth of the receiving port 23 between a latching position for latching the memory card 30 properly inserted into the memory card receiving recess 22 and therefore for preventing the memory card 30 from being ejected from the memory card receiving recess 22 by the ejecting biasing force of the spring 25, and an ejecting position as shown in FIG. 3 for releasing the memory card 30 properly inserted into the memory card receiving recess 22 so that the memory card 30 is partially ejected from the memory card receiving recess 22 by action of the ejecting biasing force of the spring 25.

This memory card retaining slider 24 can be spring-biased to be automatically slid to the latching position when the memory card 30 has been properly and completely inserted into the memory card receiving recess 22.

Referring to FIGS. 3 and 4, the memory card 30 is an external memory, such as a multi-media card, a SD memory card, and a memory stick, removable to the battery pack 20. The memory card 30 includes an array of contact terminals 31 formed along the tip end side thereof to be brought into an electrical contact with the springy contacts 15 of the operating part housing 11 when the memory card 30 is properly and completely inserted and fitted into the memory card receiving recess 22 of the battery pack 20 fitted into the battery pack receiving recess 14 of the operating part housing 11. As mentioned above, the memory card 30 has the cut 32 formed at the one corner of the tip end side thereof, so that the memory card 30 can be completely inserted into the deepest position when the memory card 30 is properly inserted into the memory card receiving recess 22 along the pair of guiding grooves 26 in such a manner that the cut corner 32 of the memory card 30 is faced to the inclined stopper surface 27.

Now, a mounting and a removal of the memory card in the shown embodiment will be explained.

In order to insert the memory card 30 into the handheld mobile phone 10, the memory card 30 is inserted from the memory card receiving port 23 of the battery pack 20 in a condition that the contact terminals 31 is faced outward, and is slid along the pair of guiding grooves 26. When the memory card 30 is properly completely inserted into the memory card receiving recess 22 against the spring 25, the slider 24 is slid from the ejecting position as shown in FIG. 3 to the latching position (slightly displaced from the ejecting position as shown in FIG. 3 toward an opposite position) for latching the memory card 30 properly inserted into the memory card receiving recess 22 and therefore for preventing the memory card 30 from being ejected from the memory card receiving recess 22 against the ejecting biasing force from the spring 25. Thus, the memory card 30 is retained in the battery pack 20 in an unremovable condition.

Thereafter, the battery pack 20 having the memory card 30 retained therein, is fitted into the the battery pack receiving recess 14 of the foldable handheld mobile phone 10 in the folded condition, and held in the unremovable condition by the spring-biased latch 17. In this condition, the power supplying terminals 21 of the battery pack 20 are brought into electrical contact with the power terminals 16 of the handheld mobile phone 10, and the contact terminals 31 of a memory card 30 are simultaneously brought into electrical and resilient contact with the springy contacts 15 of the handheld mobile phone 10. Thus, it becomes possible to utilize the memory card 30.

Incidentally, in the folded condition of the foldable handheld mobile phone 10, the memory card 30 can be inserted and removed from the battery pack 20 fitted with the handheld mobile phone 10.

On the other hand, by sliding the slider 24 from the latching position to the ejecting position as shown in FIG. 3, the memory card 30 is released from the slider 24 and partially ejected from the memory card receiving port 23 by action of the spring 25.

In the above mentioned embodiment, the handheld mobile phone is of the foldable type, but the present invention can be equally applied to a not-foldable handheld mobile phone if it is uses a detachable battery pack.

As seen from the above, according to the present invention, since the memory card is retained in the battery pack, it is sufficient if the connector mounted on the printed circuit board provided in the body of the handheld mobile phone is the springy contacts without any guide for fitting the memory card within the body of the handheld mobile phone, a space on the printed circuit board can be efficiently utilized, and the size of the body of the handheld mobile phone can be reduced.

In addition, since the since the memory card is inserted into the battery pack, it is no longer necessary to retain the memory card by a connector having long terminals which were required in the prior art, so that the body of the handheld mobile phone can be effectively thinned.

The invention has thus been shown and described with reference to the specific embodiments. However, it should be noted that the present invention is in no way limited to the details of the illustrated structures but changes and modifications may be made within the scope of the appended claims.

The invention claimed is:

1. A handheld mobile phone having a detachable battery pack which can be removably mounted to a body of the handheld mobile phone, wherein said detachable battery pack has a memory card receiving part for removably receiving a body of a memory card, said memory card receiving part including guiding grooves for guiding said memory card as it is slidably engaged with said battery pack and a retaining slider for retaining said memory card in said memory receiving part of said battery pack, and wherein the body of the handheld mobile phone has a plurality of external contacts which are brought into electrical contact with contact terminals of a memory card that is mounted in said memory card receiving part of said detachable battery pack when said detachable battery pack is mounted to the body of the handheld mobile phone.

2. A handheld mobile phone claimed in claim 1 wherein said memory card receiving part of said detachable battery pack is so configured to receive said memory card in such a condition that said contact terminals of said memory card are exposed to the body of the handheld mobile phone, and wherein said plurality of external contacts provided in the body of the handheld mobile phone are formed of a plurality of springy contacts which are brought into resilient contact with said contact terminals of said memory card mounted to said detachable battery pack when said detachable battery pack is mounted to the body of the handheld mobile phone.

3. A handheld mobile phone claimed in claim 2 wherein said detachable battery pack includes a receiving port through which said memory card is inserted, a guide means for guiding said memory card from said receiving port to said memory card receiving part, and a retaining means for detachably latching said memory card accommodated in said memory card receiving part.

4. A handheld mobile phone claimed in claim 3 wherein said receiving port is exposed when said detachable battery pack is mounted to the body of the handheld mobile phone.

5. A handheld mobile phone claimed in claim 4 wherein said detachable battery pack includes a spring provided at a deep end of said memory card receiving part, for exerting on said memory card a biasing force pushing said memory card toward said receiving port.

6. A handheld mobile phone claimed in claim 5 wherein said memory card receiving part has a stopper for preventing said memory card from being inserted to said memory card receiving part when said memory card is improperly inserted from said receiving port, and wherein said memory card has a cut which is never contacted with said stopper when said memory card is properly inserted from said receiving port to said memory card receiving part.

7. A handheld mobile phone claimed in claim 1, further including a said memory card mounted in said memory card receiving part of said detachable battery pack mounted to the body of the handheld mobile phone.

8. A handheld mobile phone as recited in claim 1, wherein said body of said mobile phone includes a receiving recess for receiving said detachable battery pack when said detachable pack is mounted to said body of said handheld mobile phone and wherein said plurality of external contacts are located within said receiving recess.

* * * * *